(12) United States Patent
Ootsuka et al.

(10) Patent No.: US 11,396,945 B2
(45) Date of Patent: Jul. 26, 2022

(54) PISTON RING, RECIPROCATING COMPRESSOR, METHOD FOR SELECTING PISTON RING AND METHOD FOR EVALUATING LIFE OF PISTON RING

(71) Applicant: KABUSHIKI KAISHA KOBE SEIKO SHO (KOBE STEEL, LTD.), Hyogo (JP)

(72) Inventors: Tomohiro Ootsuka, Takasago (JP); Naofumi Kanei, Takasago (JP)

(73) Assignee: KOBE STEEL, LTD., Hyogo (JP)

( * ) Notice: Subject to any disclaimer, the term of this patent is extended or adjusted under 35 U.S.C. 154(b) by 149 days.

(21) Appl. No.: 16/837,538

(22) Filed: Apr. 1, 2020

(65) Prior Publication Data
US 2020/0340582 A1 Oct. 29, 2020

(30) Foreign Application Priority Data
Apr. 26, 2019 (JP) .............................. JP2019-085660

(51) Int. Cl.
| | | |
|---|---|---|
| *F16J 9/28* | (2006.01) | |
| *F04B 15/00* | (2006.01) | |
| *F16J 9/26* | (2006.01) | |
| *F04B 7/06* | (2006.01) | |

(52) U.S. Cl.
CPC ................. *F16J 9/26* (2013.01); *F04B 15/00* (2013.01); *F16J 9/28* (2013.01); *F04B 7/06* (2013.01)

(58) Field of Classification Search
CPC ......... F16J 9/26; F16J 9/28; F16J 9/56; F04B 15/00; F04B 7/06
See application file for complete search history.

(56) References Cited

U.S. PATENT DOCUMENTS

| | | | |
|---|---|---|---|
| 4,432,925 A | * | 2/1984 | Holtzberg ............. F02F 7/0085 264/235 |
| 2003/0006562 A1 | | 1/2003 | Feistel |
| 2007/0090606 A1 | | 4/2007 | Ross et al. |
| 2010/0132381 A1 | | 6/2010 | Ross et al. |
| 2020/0096106 A1 | | 3/2020 | Feistel |

FOREIGN PATENT DOCUMENTS

| | | | | |
|---|---|---|---|---|
| CN | 107269514 A | * | 10/2017 | |
| KR | 100408795 B1 | * | 3/2004 | ................. F16J 9/26 |
| KR | 10-2008-0022078 A | | 3/2008 | |
| WO | 2018/108464 A1 | | 6/2018 | |
| WO | WO-2019208182 A1 | * | 10/2019 | ................. F16J 9/28 |

* cited by examiner

*Primary Examiner* — Gilbert Y Lee
(74) *Attorney, Agent, or Firm* — Studebaker & Brackett PC

(57) ABSTRACT

A piston ring is used for a reciprocating compressor. In the piston ring, polytetrafluoroethylene and polyetheretherketone or polyimide account for 50% or more by mass in total. The piston ring does not contain polyphenylene sulfide. The piston ring has a tensile strength within a range of more than 15 MPa and less than 100 MPa.

6 Claims, 4 Drawing Sheets

PISTON RING, RECIPROCATING COMPRESSOR, METHOD FOR SELECTING PISTON RING AND METHOD FOR EVALUATING LIFE OF PISTON RING

TECHNICAL FIELD

The present invention relates to a piston ring, a reciprocating compressor, a method for selecting a piston ring and a method for evaluating life of a piston ring.

BACKGROUND ART

Conventionally, in a reciprocating compressor, a piston ring is used to prevent gas leakage from a compression chamber through a gap between an outer peripheral portion of a piston and an inner wall surface of a cylinder. Japanese Unexamined Patent Publication No. 2003-49945 (Patent Document 1) discloses an example of such a piston ring made of polytetrafluoroethylene (PTFE) or polyphenylene sulfide (PPS).

The present inventors have paid attention to the following problem that is caused when a piston ring containing PPS is used for a reciprocating compressor for a hydrogen station. Specifically, a sulfur component of the PPS contained in the piston ring is gasified while hydrogen gas is compressed, so that the gasified sulfur component is mixed into compressed gas. As a result, the compressed gas containing the sulfur component may be charged into a fuel cell vehicle (FCV). In this case, the sulfur component in the gas may adversely affect normal operation of a fuel cell (e.g., decrease in power generation efficiency).

For this reason, a reciprocating compressor for a hydrogen station is required to avoid the use of a piston ring containing PPS. However, the life of a piston ring containing no PPS is significantly shorter than that of a piston ring containing PPS. Thus, when a piston ring containing no PPS is used, though mixing of a sulfur component into FCV can be suppressed, it is difficult to maintain sealing performance of the piston ring over a long operating period of time.

SUMMARY OF INVENTION

It is an object of the present invention to provide a piston ring capable of maintaining its sealing performance over a long operation period of time without containing PPS, a reciprocating compressor including the piston ring, a method for selecting the piston ring and a method capable of evaluating the life of the piston ring.

According to an aspect of the present invention, a piston ring is used for a reciprocating compressor. In the piston ring, polytetrafluoroethylene and polyetheretherketone or polyimide account for 50% or more by mass in total. The piston ring does not contain polyphenylene sulfide. The piston ring has a tensile strength within a range of more than 15 MPa and less than 100 MPa.

According to another aspect of the present invention, a reciprocating compressor pressurizes hydrogen gas to a predetermined pressure in a hydrogen station. The reciprocating compressor includes a cylinder provided with a compression chamber into which hydrogen gas is sucked, a piston that is disposed in the cylinder and is reciprocated in the cylinder to change a volume of the compression chamber, and the above piston ring that is attached to an outer peripheral portion of the piston to seal a gap between the outer peripheral portion of the piston and an inner wall surface of the cylinder.

According to yet another aspect of the present invention, a method for selecting a piston ring is the method for selecting a piston ring used for a reciprocating compressor. The method includes the step of selecting a piston ring in which polytetrafluoroethylene and polyetheretherketone or polyimide account for 50% or more by mass in total, polyphenylene sulfide is not contained and a tensile strength is within a range of more than 15 MPa and less than 100 MPa, as a piston ring to be attached to an outer peripheral portion of a piston.

According to yet another aspect of the present invention, a method for evaluating life of a piston ring is the method for evaluating the life of a piston ring used in a reciprocating compressor. The method includes the steps of investigating a correlation between an operating time of the reciprocating compressor and pressure in a space in which pressure can rise due to leakage of compressed gas through a gap between the piston ring and a cylinder, determining the operation time when the pressure in the space reaches a predetermined threshold based on the correlation, and evaluating the determined operation time as the life of the piston ring.

The present invention enables providing a piston ring capable of maintaining its sealing performance over a long operation period of time without containing PPS, a reciprocating compressor including the piston ring, a method for selecting the piston ring, and a method capable of evaluating the life of the piston ring.

DESCRIPTION OF EMBODIMENTS

Figure 1:
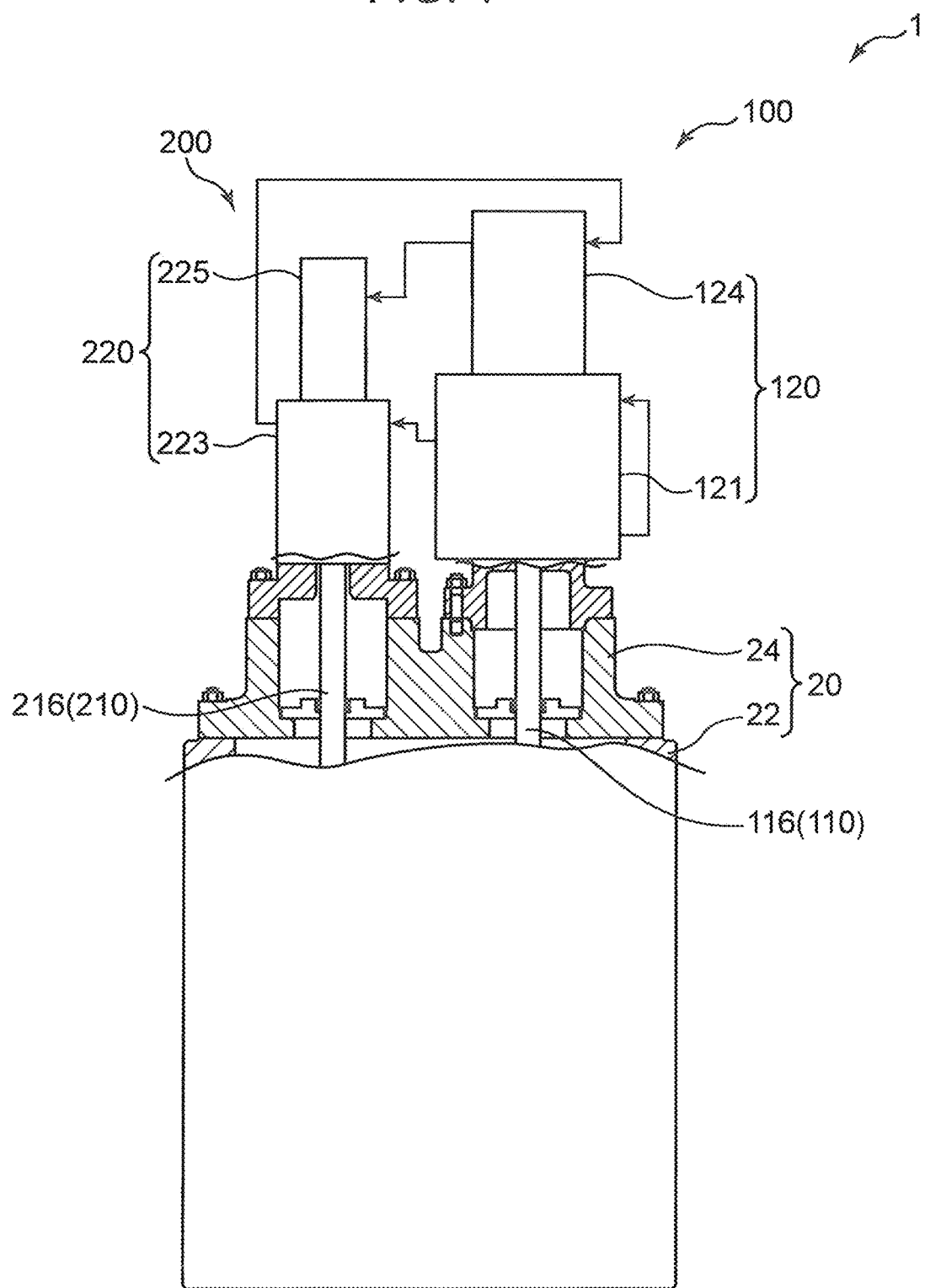
FIG. 1 is a diagram schematically illustrating a configuration of a reciprocating compressor according to an embodiment of the present invention.

Hereinafter, embodiments of the present invention will be described in detail with reference to the drawings.

(Reciprocating Compressor)

First, a configuration of a reciprocating compressor 1 according to the present embodiment will be described with reference to FIGS. 1 and 2.

The reciprocating compressor 1 according to the present embodiment pressurizes hydrogen gas to a predetermined pressure (e.g., from 0.7 MPa to 82 MPa) in a hydrogen station. The hydrogen gas compressed by the reciprocating compressor 1 is stored in a pressure accumulator (not illustrated), and is cooled in a pre-cooler (not illustrated) through heat exchange with brine or the like. Then, the hydrogen gas is charged into an FCV as fuel by a dispenser (not illustrated).

The reciprocating compressor 1 mainly includes a crankshaft (not illustrated), a crankcase 20, a first compression unit 100 and a second compression unit 200 for compressing hydrogen gas, a connection unit 300, and a piston ring 2. The reciprocating compressor 1 according to the present embodiment is a five-stage compressor in which five compression chambers are provided in series, and is installed such that the first compression unit 100 and the second compression unit 200 are each provided in an orientation extending in the direction of gravity (the vertical direction in FIG. 1). However, the compression chamber is not particularly limited in number of stages. The reciprocating compressor 1 also may be installed such that the first compression unit 100 and the second compression unit 200 are each provided in an orientation extending in the horizontal direction. Hereinafter, each component of the reciprocating compressor 1 will be described.

The crankcase 20 includes a main body 22 in a box-like shape that holds the crankshaft and opens upward in FIG. 1, and a lid part 24 in a shape closing the opening of the main body 22.

The first compression unit 100 includes a first reciprocating converter 110, a first cylinder 120, and a first pressurizing part 130. The first reciprocating converter 110 is connected to the crankshaft, and linearly reciprocates in a direction orthogonal to the axial direction of the crankshaft (the vertical direction in FIG. 1) with rotation of the crankshaft.

The first cylinder 120 includes a first low-stage cylinder 121 and a first high-stage cylinder 124. The first low-stage cylinder 121 and the first high-stage cylinder 124 are each provided inside with a compression chamber processed in a cylindrical shape, for example, into which hydrogen gas is sucked.

The first low-stage cylinder 121 is connected to an upper portion of the lid part 24. As illustrated in FIG. 2, the first low-stage cylinder 121 is provided inside with a first compression chamber 121S that is the lowest-stage compression chamber, and a second compression chamber 122S that is higher in pressure than the first compression chamber 121S by one stage.

The first high-stage cylinder 124 is connected to an upper portion of the first low-stage cylinder 121. The first high-stage cylinder 124 has an inner diameter set smaller than an inner diameter of the first low-stage cylinder 121. The first high-stage cylinder 124 is provided inside with a fourth compression chamber 124S that is higher in pressure than the second compression chamber 122S by two stages.

The first pressurizing part 130 includes a first low-stage piston 132 and a first high-stage piston 134. The first low-stage piston 132 is formed in a cylindrical columnar shape, and is connected to an upper end of a first piston rod 116 of the first reciprocating converter 110. The first low-stage piston 132 is disposed in the first low-stage cylinder 121, and vertically reciprocates in the first low-stage cylinder 121 to change volumes of the first compression chamber 121S and the second compression chamber 122S.

More specifically, the first low-stage cylinder 121 includes a space below the first low-stage piston 132 in FIG. 2, serving as the first compression chamber 121S, and a space above the first low-stage piston 132 in FIG. 2, serving as the second compression chamber 122S. That is, the first compression chamber 121S and the second compression chamber 122S are isolated from each other across the first low-stage piston 132. In the first cylinder 120, when the first low-stage piston 132 is displaced to one side (downward in FIG. 2) in a sliding direction, hydrogen gas is compressed in the first compression chamber 121S. On the other hand, when the first low-stage piston 132 is displaced to the other side (upward in FIG. 2) in the sliding direction, the hydrogen gas is compressed in the second compression chamber 122S.

The first high-stage piston 134 is formed in a cylindrical columnar shape, and is connected to an upper portion of the first low-stage piston 132. The first high-stage piston 134 is disposed in the first high-stage cylinder 124, and vertically reciprocates in the first high-stage cylinder 124 to change a volume of the fourth compression chamber 124S. Specifically, the first high-stage piston 134 compresses hydrogen gas in the fourth compression chamber 124S when being displaced to the other side (upward in FIG. 2) in the sliding direction.

The first low-stage piston 132 and the first high-stage piston 134 simultaneously slid in the same direction, so that hydrogen gas is simultaneously compressed in the second compression chamber 122S and the fourth compression chamber 124S. In addition, the first compression chamber 121S and the second compression chamber 122S are formed on both sides across the first low-stage piston 132, so that suction timing in the first compression chamber 121S is the same as discharge timing in the second compression chamber 122S, and discharge timing in the first compression chamber 121S is the same as suction timing in the second compression chamber 122S.

The second compression unit 200 includes a second reciprocating converter 210, a second cylinder 220, and a second pressurizing part 230. The second reciprocating converter 210 is connected to the crankshaft in a state 180 degrees out of phase with the first reciprocating converter 110, and linearly reciprocates in the direction orthogonal to the axial direction of the crankshaft (the vertical direction in FIG. 1) with rotation of the crankshaft. The phase shift of the second reciprocating converter 210 with respect to the first reciprocating converter 110 does not need to be exactly 180 degrees, and the shift of several degrees to several tens of degrees can be allowed. The second reciprocating converter 210 has structure that is basically the same as structure of the first reciprocating converter 110.

The second cylinder 220 includes a second low-stage cylinder 223 and a second high-stage cylinder 225. The second low-stage cylinder 223 and the second high-stage cylinder 225 are each provided inside with a compression chamber processed in a cylindrical shape, for example, into which hydrogen gas is sucked.

The second low-stage cylinder 223 is connected to an upper portion of the lid part 24 alongside the first low-stage cylinder 121. As illustrated in FIG. 2, the second low-stage cylinder 223 is provided inside with a third compression chamber 223S that is higher in pressure than the second compression chamber 122S by one stage.

The second high-stage cylinder 225 is connected to an upper portion of the second low-stage cylinder 223. The second high-stage cylinder 225 has an inner diameter set smaller than an inner diameter of the second low-stage cylinder 223. The second high-stage cylinder 225 is provided inside with a fifth compression chamber 225S that is higher in pressure than the fourth compression chamber 124S by one stage.

The second pressurizing part 230 includes a second low-stage piston 233 and a second high-stage piston 235. The second low-stage piston 233 is formed in a cylindrical columnar shape, and is connected to an upper end of a second piston rod 216 of the second reciprocating converter 210. The second low-stage piston 233 is disposed in the second low-stage cylinder 223, and vertically reciprocates in the second low-stage cylinder 223 to change a volume of the third compression chamber 223S. The second high-stage piston 235 is formed in a cylindrical columnar shape, and is connected to an upper portion of the second low-stage piston 233. The second high-stage piston 235 is disposed in the second high-stage cylinder 225, and vertically reciprocates in the second high-stage cylinder 225 to change a volume of the fifth compression chamber 225S.

The second low-stage piston 233 compresses hydrogen gas in the third compression chamber 223S when being displaced to the other side (upward in FIG. 2) in the sliding direction. The second high-stage piston 235 also compresses hydrogen gas in the fifth compression chamber 225S when being displaced to the other side (upward in FIG. 2) in the sliding direction. In the third compression chamber 223S and the fifth compression chamber 225S, hydrogen gas is simultaneously compressed. As described above, the second reciprocating converter 210 is 180 degrees out of phase with the first reciprocating converter 110, so that the first pressurizing part 130 compresses hydrogen gas in the first compression chamber 121S at the same time when the second pressurizing part 230 compresses hydrogen gas in the third compression chamber 223S and the fifth compression chamber 225S.

The connection unit 300 connects the compression chambers of the reciprocating compressor 1 to each other. Specifically, the connection unit 300 includes a first connection channel 301 connecting the first compression chamber 121S and the second compression chamber 122S, a second connection channel 302 connecting the second compression chamber 122S and the third compression chamber 223S, a third connection channel 303 connecting the third compression chamber 223S and the fourth compression chamber 124S, and a fourth connection channel 304 connecting the fourth compression chamber 124S and the fifth compression chamber 225S. Accordingly, the reciprocating compressor 1 is provided with a channel of hydrogen gas, connected in order from the first compression chamber 121S to the second compression chamber 122S, the third compression chamber 223S, the fourth compression chamber 124S, and the fifth compression chamber 225S. The third compression chamber 223S and the fifth compression chamber 225S have a pressure difference of from 40 MPa to 90 MPa, e.g., about 60 MPa. As illustrated in FIG. 2, the second connection channel 302 is provided with a pressure sensor 3 for detecting pressure of hydrogen gas in the second connection channel 302.

During drive of the reciprocating compressor 1, hydrogen gas sucked into the first compression chamber 121S is compressed, and then is sucked into the second compression chamber 122S at the same timing when discharged from the first compression chamber 121S. The hydrogen gas sucked into the second compression chamber 122S is compressed, and then is sucked into the third compression chamber 223S at the same timing when discharged from the second compression chamber 122S. Then, the hydrogen gas in the third compression chamber 223S is sucked into the fourth compression chamber 124S at the same timing when discharged. The hydrogen gas in the fourth compression chamber 124S is sucked into the fifth compression chamber 225S at the same timing when discharged.

(Piston Ring)

Next, the piston ring 2 will be described in detail. The piston ring 2 is an annular component that is attached to an outer peripheral portion of each of the pistons (the first low-stage piston 132, the first high-stage piston 134, the second low-stage piston 233, and the second high-stage piston 235). The piston ring 2 seals a gap between the outer peripheral portion of each of the pistons and an inner wall surface of the corresponding one of the cylinders (the first low-stage cylinder 121, the first high-stage cylinder 124, the second low-stage cylinder 223, and the second high-stage cylinder 225). Mounting the piston ring 2 enables preventing gas leakage from each compression chamber. The piston ring 2 is attached in a recessed groove (not illustrated) formed in an annular shape along an outer peripheral surface of each piston.

Figure 2:
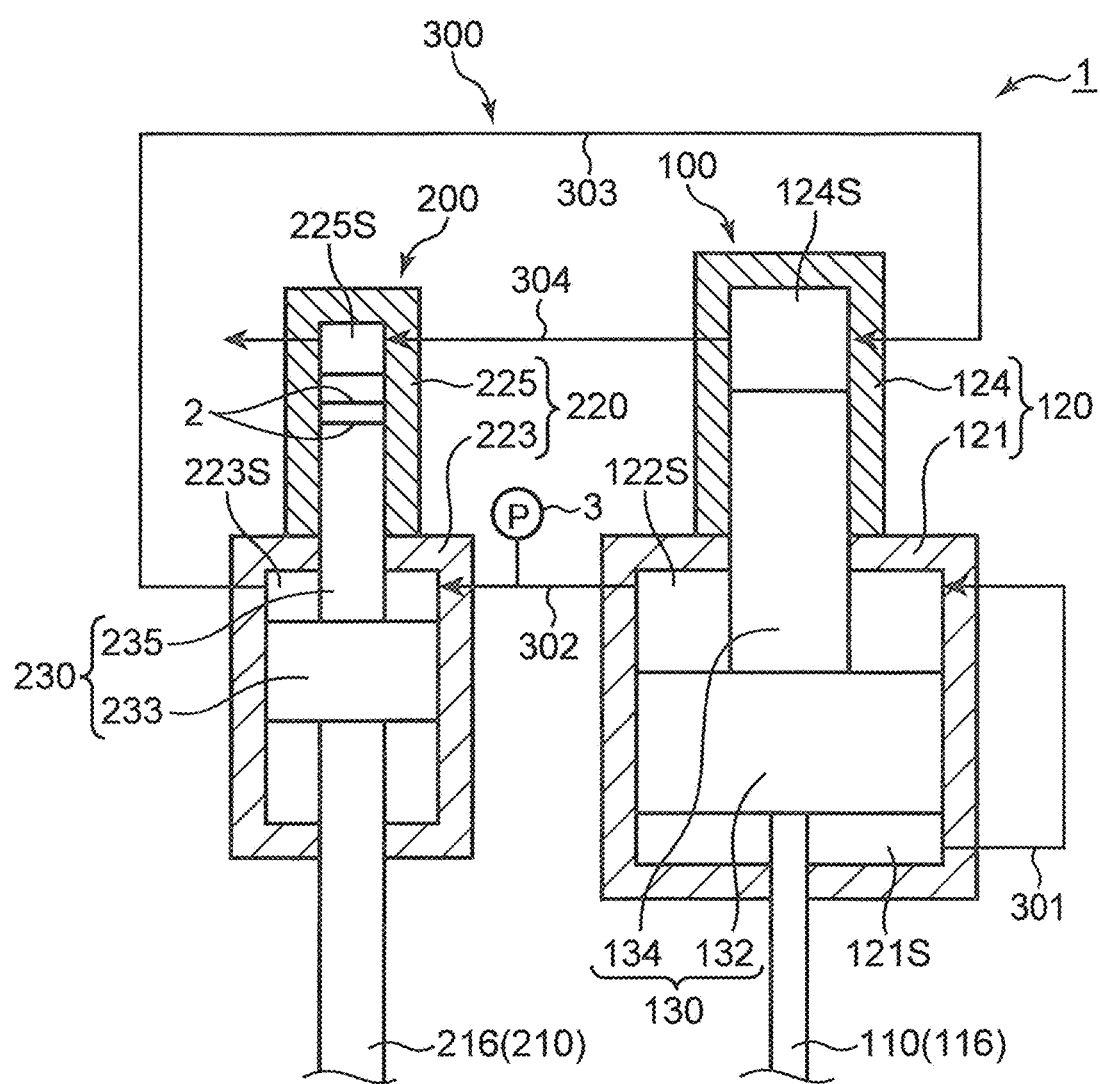
FIG. 2 is a diagram schematically illustrating a configuration of each compression unit in the reciprocating compressor according to the embodiment of the present invention.

As illustrated in FIG. 2, a plurality of piston rings 2 is attached to an outer peripheral portion of the second high-stage piston 235. The plurality of piston rings 2 each seals a gap between the outer peripheral portion of the second high-stage piston 235 and an inner wall surface of the second high-stage cylinder 225 to prevent leakage of hydrogen gas from the fifth compression chamber 225S toward the third compression chamber 223S and the second connection channel 302. Likewise, the piston ring 2 is attached to the outer peripheral portion of each of the other pistons (the first low-stage piston 132, the first high-stage piston 134, and the second low-stage piston 233) to prevent leakage of hydrogen gas from the corresponding one of the compression chambers (the second compression chamber 122S, the third compression chamber 223S, and the fourth compression chamber 124S). While the number of piston rings 2 attached to each piston is not particularly limited, about twenty piston rings 2 are attached to the second high-stage piston 235 in the present embodiment.

In the piston ring 2, polytetrafluoroethylene (PTFE) and polyetheretherketone (PEEK) account for 50% or more by mass in total. The piston ring 2 does not contain polyphenylene sulfide (PPS). As an alternative, in the piston ring 2, PTFE and polyimide (PI) may account for 50% or more by mass in total and PPS may not be contained. The piston ring 2 contains a "base resin" of "PTFE and PEEK" or "PTFE and PI".

By using the piston ring 2 without containing PPS as described above, it is possible to prevent a sulfur component derived from PPS being mixed into compressed gas (hydrogen gas). Accordingly, it is possible to prevent a sulfur component being mixed into an FCV at the time of charging fuel (hydrogen gas). As a result, it is possible to prevent the sulfur component from affecting normal operation of a fuel cell.

In general, a piston ring without containing PPS is significantly deteriorated in seal life. To the contrary, according to the piston ring 2 of the present embodiment, it is possible to prevent a sulfur component being mixed into hydrogen gas and to suppress deterioration in seal life by adjusting its tensile strength to an appropriate range. Specifically, the piston ring 2 according to the present embodiment has a tensile strength within the range of more than 15 MPa and less than 100 MPa. Accordingly, it is possible to prevent a sulfur component being mixed into an FCV and to improve seal life as compared with a piston ring having a tensile strength out of the above range. As a result, sufficient sealing performance can be maintained even during operation of the reciprocating compressor 1 over a long period, so that gas leakage from each compression chamber can be prevented.

The piston ring 2 has a tensile strength that is preferably 55 MPa or less, more preferably 45 MPa or more, and even more preferably 44.8 MPa or more and 55 MPa or less.

The piston ring 2 is a commercially available product, and its "tensile strength" is a nominal value described in a piston ring catalog or the like. However, the "tensile strength" may be a value measured based on JIS K7161 (Plastic-Test Method for Tensile Properties Part 1: General Rules).

The piston ring 2 may further contain an additive such as carbon fiber or graphite along with the above base resin. Examples of the carbon fiber include a polyacrylonitrile (PAN) type and a pitch type. Examples of the graphite include artificial graphite and natural graphite. However, these additives are not essential components in the piston ring of the present invention and may not be contained.

(Method for Selecting Piston Ring)

Next, a method for selecting a piston ring according to an embodiment of the present invention will be described.

The method for selecting a piston ring according to the present embodiment is the method for selecting a piston ring to be attached to each of the pistons (the first low-stage piston 132, the first high-stage piston 134, the second low-stage piston 233, and the second high-stage piston 235) before manufacturing the reciprocating compressor 1 described above.

Specifically, the piston ring 2 according to the present embodiment described above, i.e., the piston ring 2 in which PTFE and PEEK or PI are contained as a base resin, PPS is not contained and a tensile strength is within the range of more than 15 MPa and less than 100 MPa, is selected as a piston ring to be attached to the outer peripheral portion of each piston in the manufacturing process of the reciprocating compressor 1.

(Method for Evaluating Life of Piston Ring)

Next, a method for evaluating life of a piston ring according to the present embodiment will be described.

In the reciprocating compressor 1 according to the present embodiment described above, as wear of the piston ring 2 attached to the second high-stage piston 235 progresses, the amount of hydrogen gas leaking from the fifth compression chamber 225S to the third compression chamber 223S through a gap between the outer peripheral portion of the second high-stage piston 235 and the inner wall surface of the second high-stage cylinder 225 increases. Accordingly, the pressure of hydrogen gas exceeds a processing capacity of the third compression chamber 223S, so that pressure of the hydrogen gas in the second connection channel 302 (hereinafter, also referred to as "third-stage suction pressure") increases. In the method for evaluating life of a piston ring according to the present embodiment, the piston ring 2 attached to the second high-stage piston 235 is evaluated for its life by continuously monitoring the third-stage suction pressure using the pressure sensor 3 during operation of the reciprocating compressor 1, as described below.

First, a correlation between operation time of the reciprocating compressor 1 and the third-stage suction pressure is investigated. Specifically, the reciprocating compressor 1 is continuously operated for a predetermined period of time, during which the pressure sensor 3 continuously measures the third-stage suction pressure.

The third-stage suction pressure is pressure in a space in which pressure can rise due to leakage of compressed gas through a gap between the piston ring 2 and the second high-stage cylinder 225, i.e., pressure in the second connection channel 302.

Figure 3:
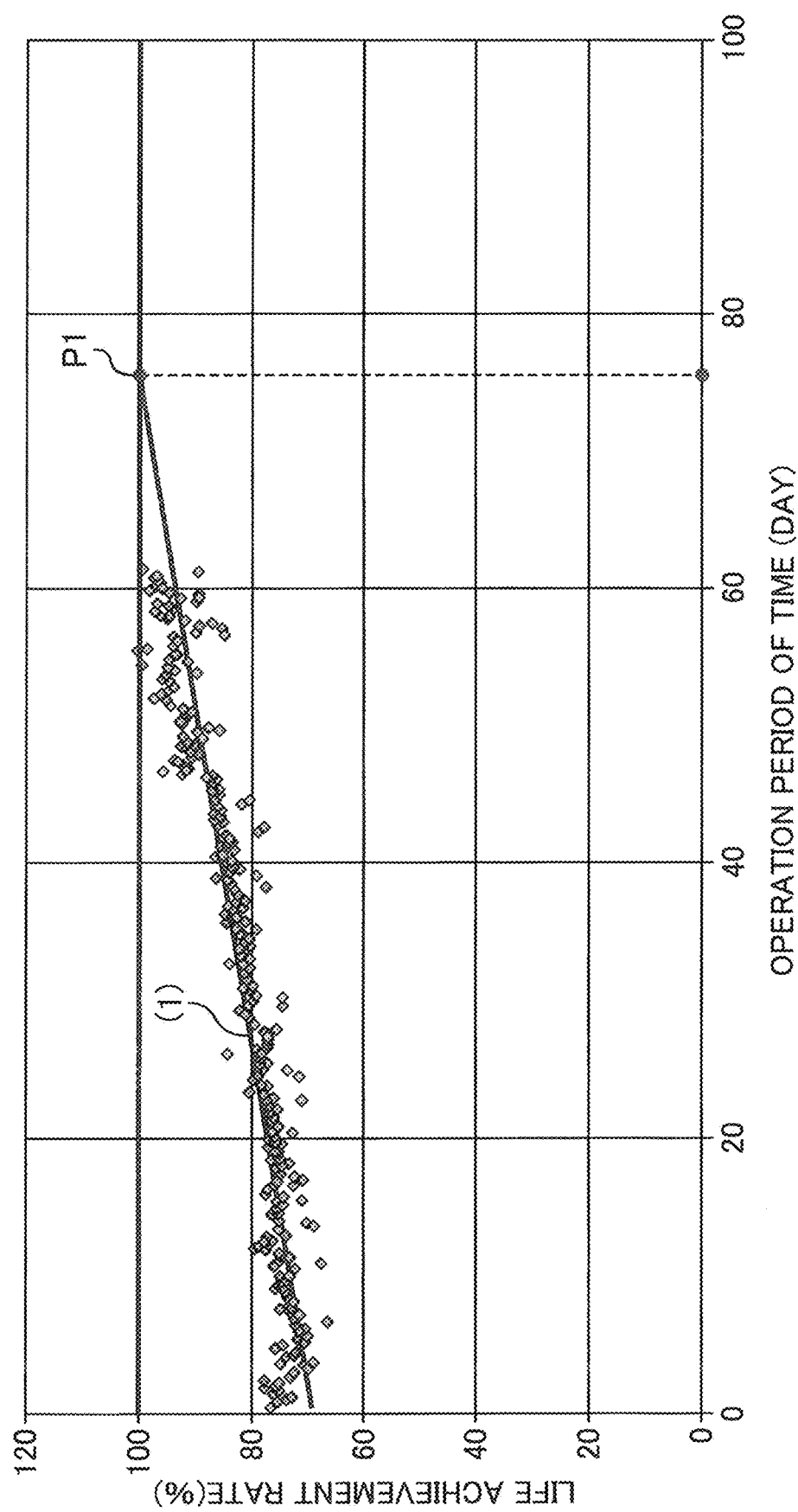
FIG. 3 is a graph showing a relationship between an operation period of time of a reciprocating compressor and a life achievement rate.

Accordingly, a graph showing a relationship between an operation period of time of the reciprocating compressor 1 (horizontal axis) and the third-stage suction pressure (vertical axis) is obtained, as exemplified in FIG. 3. The horizontal axis of the graph represents a value obtained by dividing a total operation time of the reciprocating compressor 1 by five hours (specific operation time per day in a hydrogen station). In addition, the vertical axis of the graph represents a ratio (life achievement rate (%)) of an actual measurement value of the third-stage suction pressure to a threshold of the third-stage suction pressure (a value of the third-stage suction pressure when the piston ring 2 is considered reaching its end of life). Reference numeral (1) in the graph denotes a regression line calculated by the least squares method based on plotted data. The reference numeral (1) may denote a regression curve instead of the regression line.

Next, operating time of the reciprocating compressor 1 when the third-stage suction pressure reaches a predetermined threshold, i.e., when the life achievement rate that is a vertical axis value in the graph of FIG. 3 becomes 100(%), is determined based on the above correlation, and the determined operation time is evaluated as the life of the piston ring 2. Specifically, an x value (x value at point P1 in FIG. 3) acquired by substituting 100(%) for a y value in an equation expressing the regression line (1) in FIG. 3 is estimated as the life of the piston ring 2.

The life of piston ring of Examples 1, 2 and Comparative Examples 1 to 5 in Table 1 below was evaluated by the method for evaluating life of a piston ring according to the above embodiment. In each of Examples 1, 2 and Comparative Examples 1 to 5, twenty piston rings identical in type were attached to the second high-stage piston 235.

Figure 4:
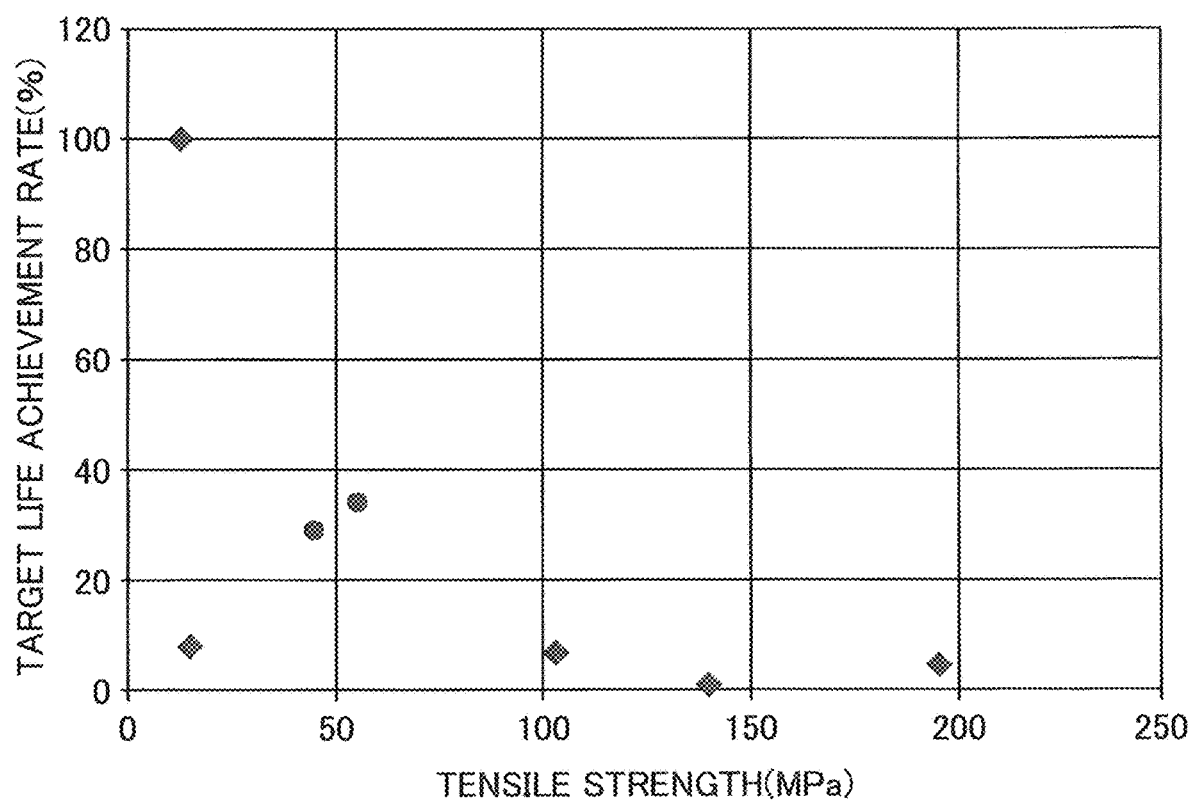
FIG. 4 is a graph showing a relationship between tensile strength of a piston ring and a target life achievement rate of the piston ring.

Table 1 below shows materials and tensile strengths (MPa) of the piston rings of Examples 1, 2 and Comparative Examples 1 to 5. In Table 1, a mark "o" means that a corresponding material is contained in the piston ring, and a mark "x" means that the corresponding material is not contained in the piston ring. In Example 1, PTFE and PI account for 50% or more by mass in total. In Example 2, PTFE and PEEK account for 50% or more by mass in total. "CF" means carbon fiber, "GP" means graphite, and "TPI" means thermoplastic polyimide. In addition, "target life achievement rate (%)" is a value (%) acquired by dividing an operation period of time acquired from the regression line when the life achievement rate of each piston ring becomes 100% by an operation period of time acquired from the regression line when a life achievement rate of the piston ring of Comparative Example 1 becomes 100% and multiplying by 100. FIG. 4 is a graph based on the data of Table 1, and shows a relationship between tensile strength (horizontal axis) of each piston ring and a target life achievement rate (vertical axis) thereof.

TABLE 1

| | MATERIAL | | | | | | | TENSILE STRENGTH (MPa) | TARGET LIFE ACHIEVEMENT RATE (%) |
|---|---|---|---|---|---|---|---|---|---|
| | PTFE | PEEK | PI | TPI | CF | GP | PPS | | |
| EXAMPLE 1 | o | x | o | x | o | o | x | 44.8 | 29 |
| EXAMPLE 2 | o | o | x | x | o | x | x | 55 | 34 |
| COMPARATIVE EXAMPLE 1 | o | x | x | x | x | x | o | 13 | 100 |
| COMPARATIVE EXAMPLE 2 | o | o | x | x | x | o | x | 103 | 7 |
| COMPARATIVE EXAMPLE 3 | o | x | x | x | o | x | x | 15 | 8 |
| COMPARATIVE EXAMPLE 4 | x | x | x | o | x | x | x | 195 | 5 |
| COMPARATIVE EXAMPLE 5 | x | x | o | x | o | x | x | 140 | 1 |

Based on the results shown in Table 1 and FIG. 4, the following can be considered.

First, in Comparative Example 3 in which PTFE is contained as a base resin as in Comparative Example 1 and no PPS is added, the life of piston rings became significantly deteriorated compared to Comparative Example 1. In addition, while PTFE and PEEK are contained as a base resin to increase strength of the piston ring in Comparative Example 2, the piston rings were not improved in life. As the reason for this result, it is conceivable that tensile strength of the piston ring is 100 MPa or more (103 MPa) in Comparative Example 2, the piston ring became too hard due to a large content of PEEK, and thereby sufficient sealing performance could not be obtained. In Comparative Examples 4 and 5, tensile strength of the piston ring is 100 MPa or more (195 MPa, 140 MPa) as in Comparative Example 2, the piston rings were not improved in life.

To the contrary, in Examples 1 and 2, a ratio of deterioration in life with respect to Comparative Example 1 was smaller than that of Comparative Examples 2 to 5. In other words, a target life achievement ratio of Examples 1 and 2 was higher than that of Comparative Examples 2 to 5. In Example 1, PTFE and PI are contained as a base resin, and the tensile strength is within the range of more than 15 MPa and less than 100 MPa (44.8 MPa). In Example 2, PTFE and PEEK are contained as a base resin, and the tensile strength is within the range of more than 15 MPa and less than 100 MPa (55 MPa). From the above result, it became clear that desired seal life can be obtained without containing PPS by using the piston ring according to the present invention. It is also found that using tensile strength as an index enables comparison of predicted lives of a plurality of types of piston rings.

It is to be recognized that the embodiments and examples disclosed herein are illustrative in all aspects, and are not restrictive. The scope of the present invention is shown in the scope of claims instead of the above description, and is intended to include meaning equivalent to the scope of claims and all modifications in the scope of claims.

Here, other embodiments of the present invention will be described.

While in the above embodiment, the reciprocating compressor 1 provided with a plurality of stages (five stages) of compression chambers has been described, the reciprocating compressor of the present invention can also be applied to a single stage type reciprocating compressor provided with only one compression chamber.

While in the above embodiment, evaluation of the life of the piston ring 2 attached to the second high-stage piston 235 has been described, a piston ring attached to another piston can be similarly evaluated for its life. Specifically, a piston ring attached to the first low-stage piston 132 can be evaluated for its life based on pressure in a space in which pressure can rise due to leakage of compressed gas through a gap between the piston ring and the first low-stage cylinder 121. A piston ring attached to the first high-stage piston 134 can be evaluated for its life based on pressure in a space in which pressure can rise due to leakage of compressed gas through a gap between the piston ring and the first high-stage cylinder 124. A piston ring attached to the second low-stage piston 233 can be evaluated for its life based on pressure in a space in which pressure can rise due to leakage of compressed gas through a gap between the piston ring and the second low-stage cylinder 223.

The following is a brief description of the above embodiment.

The piston ring according to the above embodiment is used for a reciprocating compressor. In the piston ring, polytetrafluoroethylene and polyetheretherketone or polyimide account for 50% or more by mass in total. The piston ring does not contain polyphenylene sulfide. The piston ring has a tensile strength within a range of more than 15 MPa and less than 100 MPa.

The present inventors have intensively studied to improve the life of a piston ring containing no PPS. As a result, the present inventors have focused on tensile strength among various characteristics of the piston ring, and have found that even a piston ring with no added PPS can maintain its high sealing performance over a long period of time by adjusting its tensile strength to be within an appropriate range.

The piston ring according to the above embodiment is based on the above viewpoint. That is, the piston ring according to the above embodiment has a tensile strength adjusted to be within the range of more than 15 MPa and less than 100 MPa, and is greatly improved in life compared to a piston ring having a tensile strength out of the above range (15 MPa or less, or 100 MPa or more). Thus, when this piston ring is attached to a piston of a reciprocating compressor and used, it is possible to prevent a sulfur component derived from PPS being mixed into compressed gas, and to suppress gas leakage from a compression chamber over a long operation period of time.

The above piston ring may have a tensile strength of 55 MPa or less.

This enables not only improving the life of the piston ring but also preventing deterioration in sealing performance of the piston ring due to a high tensile strength (hard piston ring) compared to a piston ring having a tensile strength more than 55 MPa.

The reciprocating compressor according to the above embodiment pressurizes hydrogen gas to a predetermined pressure in a hydrogen station. The reciprocating compressor includes a cylinder provided with a compression chamber into which hydrogen gas is sucked, a piston that is disposed in the cylinder and is reciprocated in the cylinder to change a volume of the compression chamber, and the above piston ring that is attached to an outer peripheral portion of the piston to seal a gap between the outer peripheral portion of the piston and an inner wall surface of the cylinder.

Since this reciprocating compressor uses a piston ring containing no PPS, it is possible to prevent a sulfur component derived from PPS being mixed into hydrogen gas. Accordingly, it is possible to prevent the sulfur component derived from PPS from adversely affecting normal operation of a fuel cell mounted on an FCV. Moreover, the life of the piston ring is improved by adjusting its tensile strength to be within an appropriate range. Thus, high sealing performance of the piston ring can be maintained over a long operation period of time, and gas leakage from a compression chamber can be effectively prevented.

The method for selecting a piston ring according to the above embodiment is the method to select a piston ring used for a reciprocating compressor. The method comprises the step of selecting a piston ring in which polytetrafluoroethylene and polyetheretherketone or polyimide account for 50% or more by mass in total, polyphenylene sulfide is not contained and a tensile strength is within a range of more than 15 MPa and less than 100 MPa, as a piston ring to be attached to an outer peripheral portion of a piston.

According to this method, a piston ring containing no PPS and improved in life can be selected. When a reciprocating compressor with this piston ring attached to a piston is operated, it is possible to prevent a sulfur component derived from PPS being mixed into compressed gas, and to suppress gas leakage from a compression chamber over a long period of time.

The method for evaluating life of a piston ring according to the above embodiment is the method to evaluate the life of a piston ring used in a reciprocating compressor. The method includes the steps of investigating a correlation between an operating time of the reciprocating compressor and pressure in a space in which pressure can rise due to leakage of compressed gas through a gap between the piston ring and a cylinder, determining the operation time when the pressure in the space reaches a predetermined threshold based on the correlation, and evaluating the determined operation time as the life of the piston ring.

According to this method, the life of a piston ring can be accurately evaluated by monitoring pressure in a space in which pressure can rise due to leakage of compressed gas, without directly measuring the amount of wear of the piston ring. Thus, unlike a method for directly measuring the amount of wear of a piston ring, the compressor is not required to be disassembled each time, so that the life of the piston ring can be easily evaluated.

This application is based on Japanese Patent application No. 2019-085660 filed in Japan Patent Office on Apr. 26, 2019, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A piston ring used for a reciprocating compressor, wherein
   polytetrafluoroethylene, and one selected from polyetheretherketone and polyimide account for 50% or more by mass in total,
   the piston ring does not contain polyphenylene sulfide,
   the piston ring has a tensile strength within a range of more than 15 MPa and less than 100 MPa.

2. The piston ring according to claim 1, having a tensile strength of 55 MPa or less.

3. A reciprocating compressor configured to pressurize hydrogen gas to a predetermined pressure in a hydrogen station, the reciprocating compressor comprising:
   a cylinder provided with a compression chamber into which hydrogen gas is sucked;
   a piston that is disposed in the cylinder and is reciprocated in the cylinder to change a volume of the compression chamber; and
   the piston ring according to claim 1, being attached to an outer peripheral portion of the piston to seal a gap between the outer peripheral portion of the piston and an inner wall surface of the cylinder.

4. A reciprocating compressor configured to pressurize hydrogen gas to a predetermined pressure in a hydrogen station, the reciprocating compressor comprising:
   a cylinder provided with a compression chamber into which hydrogen gas is sucked;
   a piston that is disposed in the cylinder and is reciprocated in the cylinder to change a volume of the compression chamber; and
   the piston ring according to claim 2, being attached to an outer peripheral portion of the piston to seal a gap between the outer peripheral portion of the piston and an inner wall surface of the cylinder.

5. A method for selecting a piston ring used for a reciprocating compressor, the method comprising the step of:
   selecting a piston ring in which polytetrafluoroethylene, and one selected from polyetheretherketone and polyimide account for 50% or more by mass in total, polyphenylene sulfide is not contained and a tensile strength is within a range of more than 15 MPa and less than 100 MPa, as a piston ring to be attached to an outer peripheral portion of a piston.

6. A method for evaluating life of a piston ring used in a reciprocating compressor, the method comprising the steps of:
   investigating a correlation between an operating time of the reciprocating compressor and pressure in a space in which pressure can rise due to leakage of compressed hydrogen gas through a gap between the piston ring and a cylinder;
   determining the operation time when the pressure in the space reaches a predetermined threshold based on the correlation; and
   evaluating the determined operation time as the life of the piston ring.

* * * * *